United States Patent
Pancotti

(10) Patent No.: US 8,960,591 B2
(45) Date of Patent: Feb. 24, 2015

(54) TILT-ROTOR AIRCRAFT

(75) Inventor: Santino Pancotti, I-Gallarate (IT)

(73) Assignee: Alenia Aermacchi S.p.A., Venegono Superiore (IT)

(*) Notice: Subject to any disclaimer, the term of this patent is extended or adjusted under 35 U.S.C. 154(b) by 524 days.

(21) Appl. No.: 13/389,966

(22) PCT Filed: Aug. 10, 2010

(86) PCT No.: PCT/IB2010/001987
§ 371 (c)(1),
(2), (4) Date: Apr. 25, 2012

(87) PCT Pub. No.: WO2011/018697
PCT Pub. Date: Feb. 17, 2011

(65) Prior Publication Data
US 2012/0211608 A1    Aug. 23, 2012

(30) Foreign Application Priority Data
Aug. 11, 2009   (IT) .............................. TO2009A0632

(51) Int. Cl.
*B64C 27/22*   (2006.01)
*B64C 29/00*   (2006.01)

(52) U.S. Cl.
CPC .................................. *B64C 29/0033* (2013.01)
USPC ................. 244/7 C; 244/7 R; 244/56; 244/66

(58) Field of Classification Search
USPC ...................... 244/7 C, 7 R, 56, 66, 48, 17.11
See application file for complete search history.

(56) References Cited

U.S. PATENT DOCUMENTS

| 2,814,451 | A | | 11/1957 | Turner | |
|---|---|---|---|---|---|
| 3,106,369 | A | | 10/1963 | Borst | |
| 3,666,209 | A | * | 5/1972 | Taylor | 244/7 C |
| 5,096,140 | A | * | 3/1992 | Dornier et al. | 244/7 C |
| 5,141,176 | A | | 8/1992 | Kress et al. | |
| 6,367,736 | B1 | * | 4/2002 | Pancotti | 244/7 R |

(Continued)

FOREIGN PATENT DOCUMENTS

| EP | 0416590 | 3/1991 |
|---|---|---|
| EP | 1057724 | 12/2000 |

(Continued)

OTHER PUBLICATIONS

JP Office Action dated Apr. 9, 2014 for corresponding JP application No. 2012-524299.

*Primary Examiner* — Christopher P Ellis
(74) *Attorney, Agent, or Firm* — Gottlieb, Rackman & Reisman, P.C.

(57) ABSTRACT

A convertiplane having a fuselage with a first axis; and two rotors having respective shafts and fitted to a wing having a fixed portion connected to the fuselage, and a movable portion which supports the rotors, is connected to the fixed portion to rotate about a second axis crosswise to the first axis and to the shafts of the rotors, and is formed in one piece defined by two half-wings located on opposite sides of the fixed portion and each supporting a respective rotor, and by an elongated member extending along the whole wing and connecting the two half-wings; the rotors being powered by a motor via a transmission comprising a transmission shaft connecting the shafts of the rotors and coaxial with the second axis.

12 Claims, 6 Drawing Sheets

(56) References Cited

U.S. PATENT DOCUMENTS

| | | | |
|---|---|---|---|
| 8,702,031 B2 * | 4/2014 | Morris | 244/6 |
| 2009/0266942 A1 * | 10/2009 | Karem | 244/7 C |
| 2010/0276549 A1 * | 11/2010 | Karem | 244/7 A |
| 2014/0191088 A1 * | 7/2014 | Karem | 244/7 C |

FOREIGN PATENT DOCUMENTS

| | | |
|---|---|---|
| EP | 1057725 | 12/2000 |
| FR | 1391203 | 3/1965 |
| JP | S38-008020 | 0/0000 |
| JP | 2001-001995 | 9/2001 |

* cited by examiner

TILT-ROTOR AIRCRAFT

This application is the U.S. National Phase application of PCT/IB2010/001987 filed Aug. 10, 2010 which claims priority from Italian Patent Application Serial No. TO2009A000632 filed Aug. 11, 2009.

TECHNICAL FIELD

The present invention relates to a convertiplane, i.e. a hybrid aircraft with adjustable rotors, capable of selectively assuming an "aeroplane" configuration, in which the rotors are positioned with their axes substantially parallel to the longitudinal axis of the aircraft, and a "helicopter" configuration, in which the rotors are positioned with their axes substantially vertical and crosswise to the longitudinal axis of the aircraft, so as to combine the advantages of a fixed-wing turboprop aircraft and a helicopter.

The ability to adjust its rotors as described enables a convertiplane to take off and land like a helicopter, i.e. with no need for a runway and along extremely steep trajectories, to minimize ground noise and, for example, even take off and land in urban areas; and to fly like an aeroplane capable of reaching and maintaining a cruising speed of roughly 500 km/h, or at any rate higher than the roughly 300 km/h cruising speed of a helicopter, and a typical cruising height of 7500 meters, which is roughly twice that of a helicopter, and enables it to fly above most cloud formations and atmospheric disturbance.

In other words, with respect to a conventional helicopter, a convertiplane has the advantages of almost twice the cruising speed; substantially twice the flying distance and time for a given payload and fuel supply, thus making it cheaper to operate; and over twice the cruising height, thus making it insensitive to weather conditions (clouds, turbulence) over most of the flight. With respect to a conventional aeroplane, on the other hand, a convertiplane has the advantages of being able to hover, and to take off and land in confined spaces, even in urban areas.

BACKGROUND ART

At present, substantially two convertiplane configurations are known: "Tilt Rotor", in which the wings remain substantially fixed, and only the motor-rotor assemblies rotate with their nacelles; and "Tilt Wing", in which the rotor attitude is adjusted by rotating the wing-propulsion system assembly as a whole.

A tilt-wing convertiplane, i.e. of the type to which the present invention refers, is known from EP-1057724, which describes an aircraft or convertiplane comprising two motor-rotor assemblies, each fitted to a respective wing portion, which is mounted to rotate about an axis crosswise to the longitudinal axis of the aircraft, to selectively set the respective motor-rotor assembly to a helicopter configuration or aeroplane configuration.

Though undoubtedly valid both structurally and functionally, the above known convertiplane has several drawbacks by being complicated in design and therefore relatively expensive to produce. This is mainly due to the presence of two separately controlled rotating wing portions; and two motor-rotor assemblies, which must be synchronized with one another and, having to rotate the rotors in opposite directions, cannot be perfectly identical.

DISCLOSURE OF INVENTION

It is an object of the present invention to provide a tilt-wing convertiplane, which is easy and relatively cheap to produce, comprises far fewer component parts, and provides for eliminating the aforementioned drawbacks.

According to the present invention, there is provided a tilt-wing convertiplane as claimed in Claim 1 and preferably in any one of the following Claims depending directly or indirectly on Claim 1.

BRIEF DESCRIPTION OF THE DRAWINGS

A non-limiting embodiment of the invention will be described by way of example with reference to the accompanying drawings, in which.

BEST MODE FOR CARRYING OUT THE INVENTION

Figure 1:
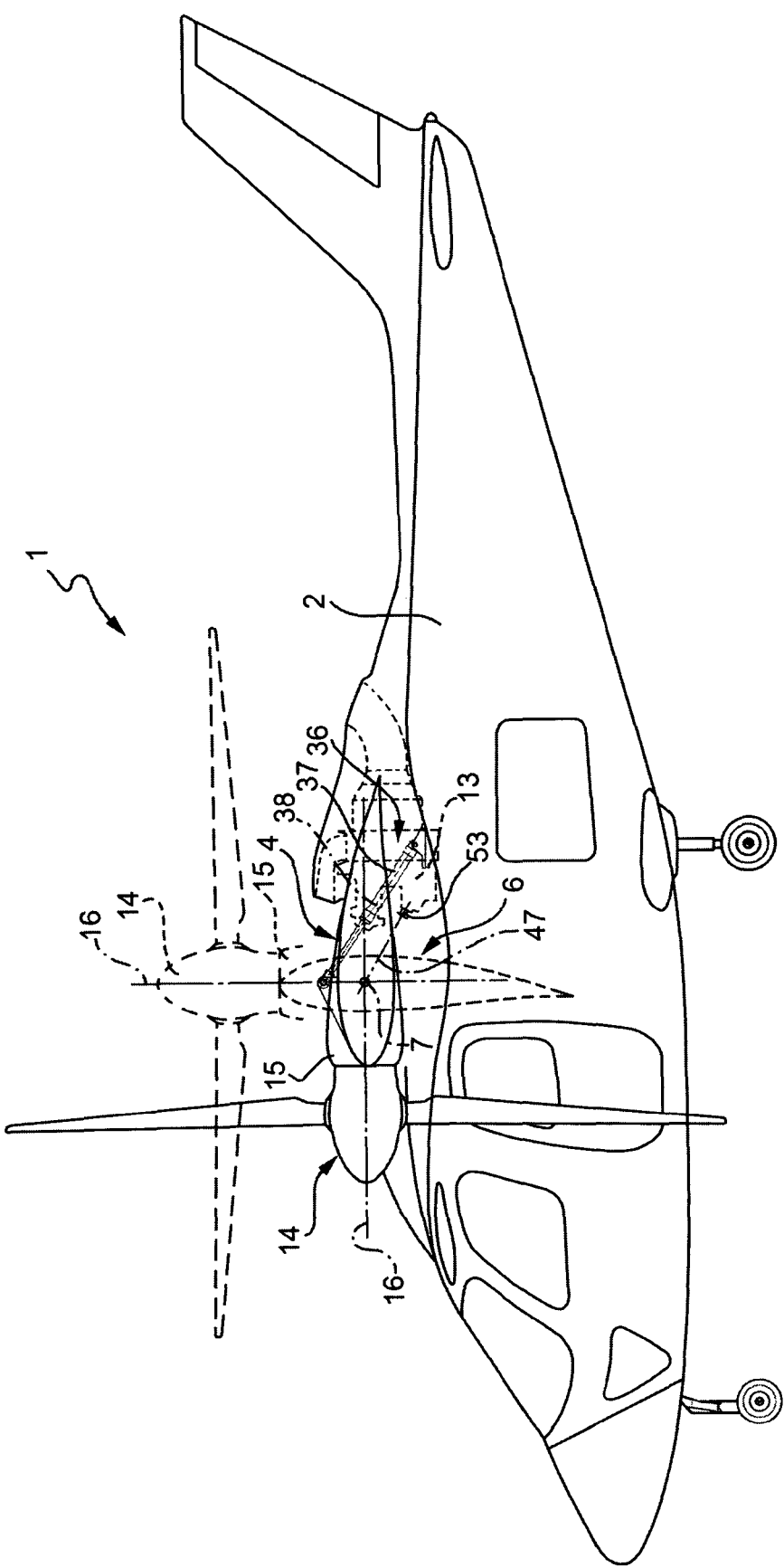
FIG. 1 shows a side view of a preferred embodiment of the tilt-wing convertiplane according to the present invention.
Figure 2:
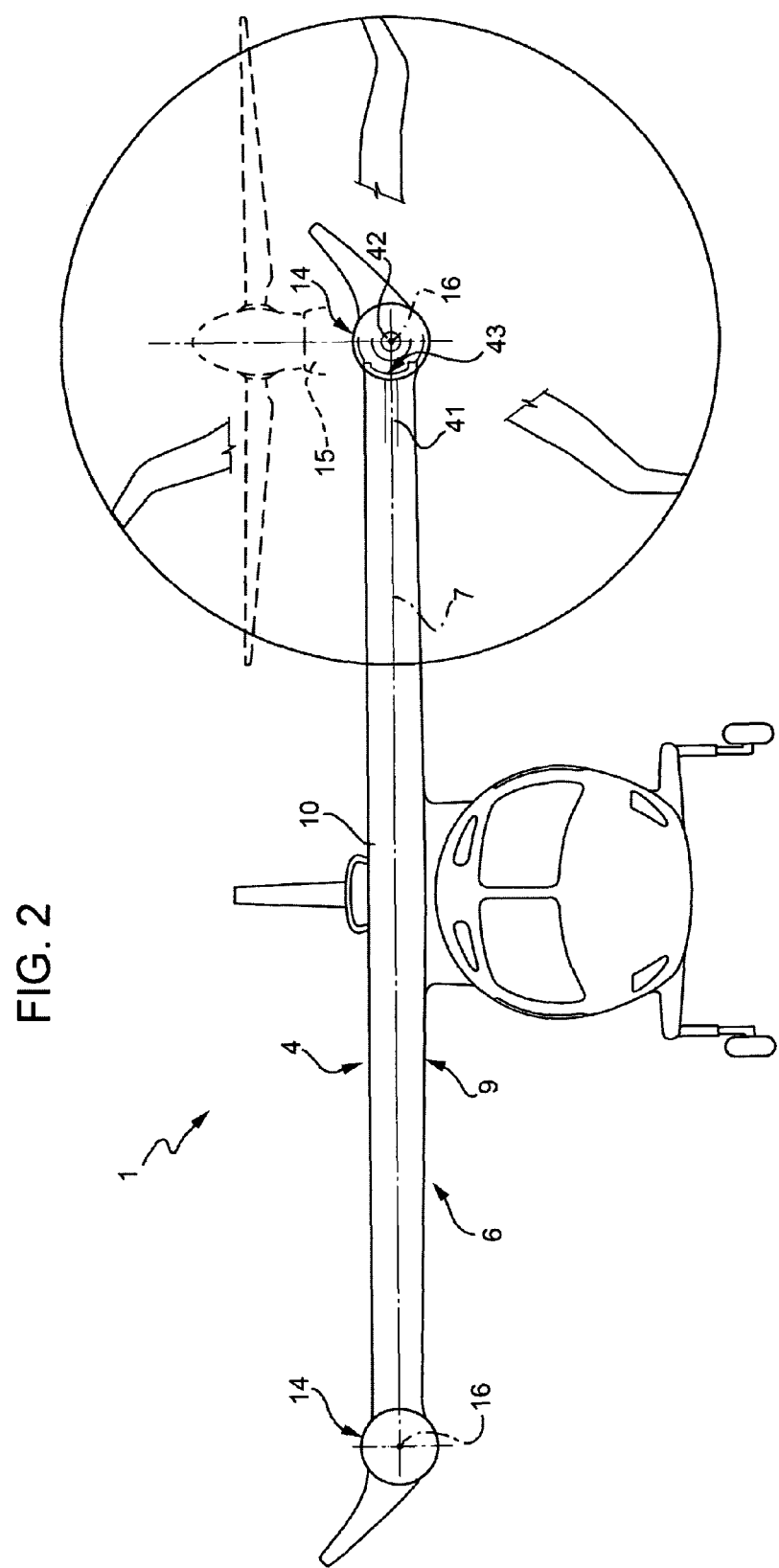
FIG. 2 shows a front view of the FIG. 1 convertiplane.
Figure 3:
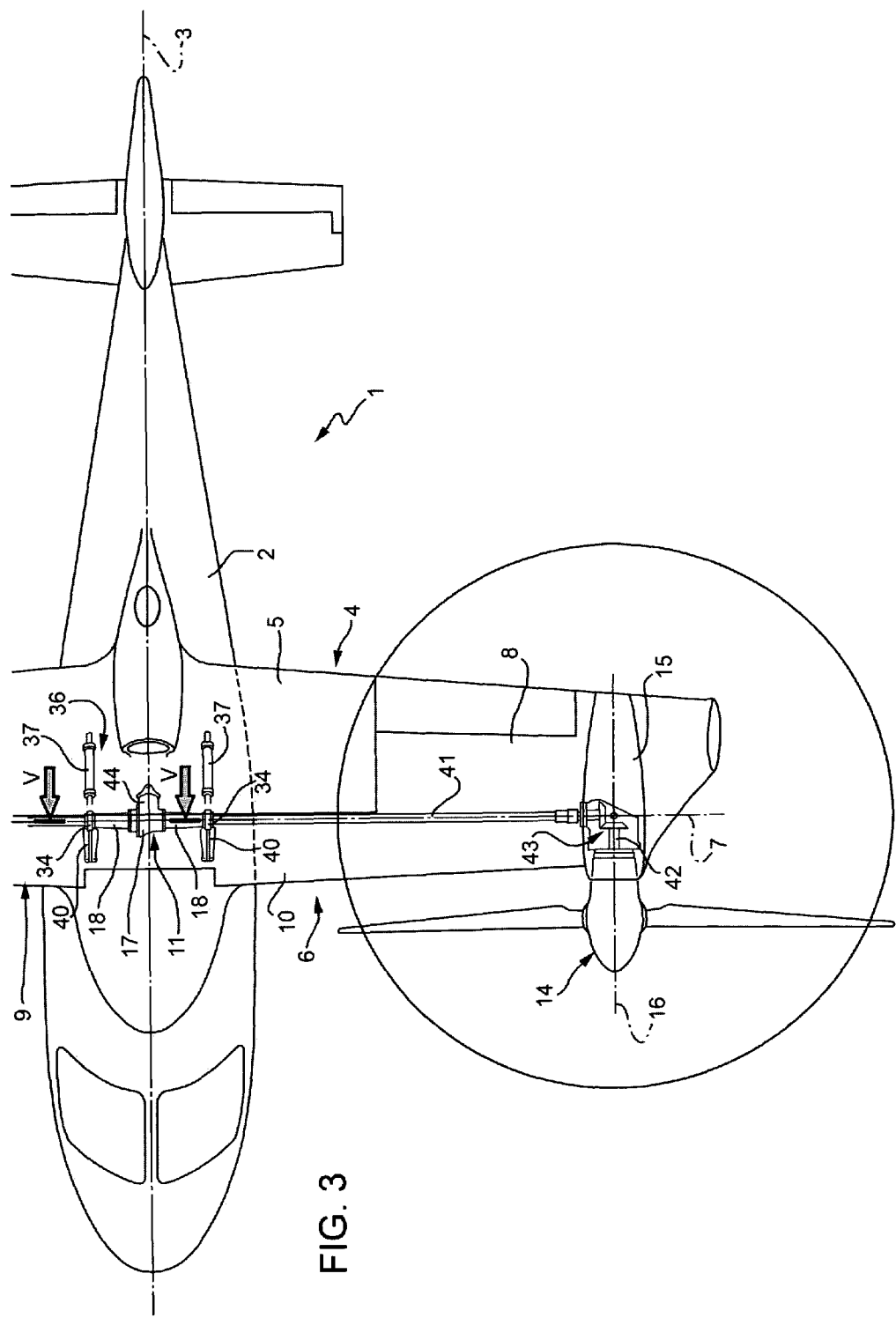
FIG. 3 shows a partial plan view of the FIG. 1 convertiplane.
Figure 4:
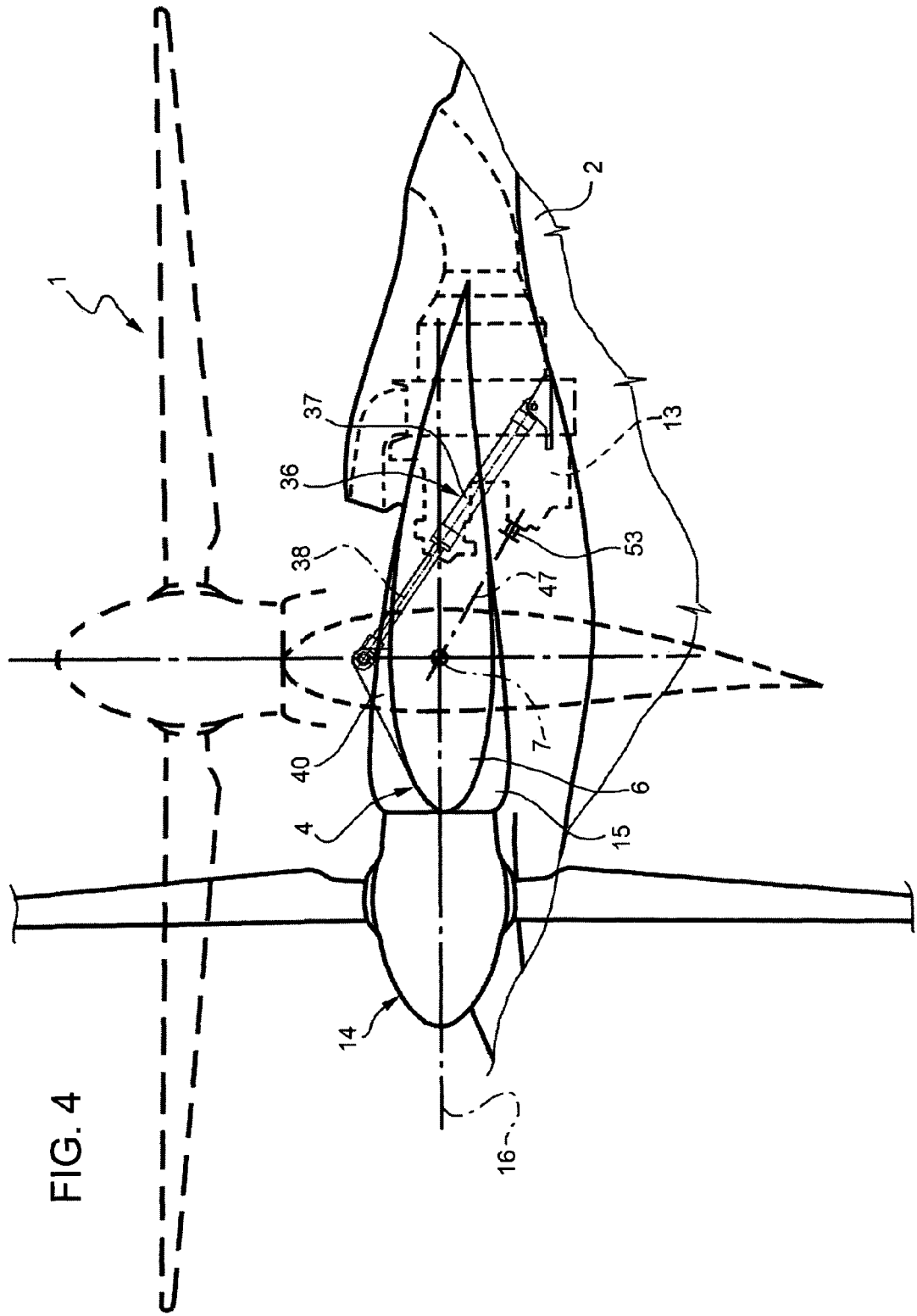
FIG. 4 shows a larger-scale view of a detail in FIG. 1.

Number 1 in FIGS. 1 to 4 indicates as a whole a convertiplane comprising a fuselage 2 having a longitudinal axis 3; and a top wing 4, which, as shown more clearly in FIG. 3, comprises a substantially horizontal fixed portion 5 positioned centrally on top of and connected integrally to fuselage 2, and a single movable portion 6, which extends partly in front of fixed portion 5, and is mounted to rotate, with respect to fixed portion 5 and about a substantially horizontal axis 7 crosswise to longitudinal axis 3, between a lowered position (shown by the continuous line in FIG. 1) substantially coplanar with fixed portion 5, and a raised position (shown by the dash line in FIG. 1) substantially perpendicular to fixed portion 5.

Movable portion 6 comprises two half-wings 8 projecting from fuselage 2, located on opposite sides of fixed portion 5, and connected integrally by an elongated member defined by a ribbed panel 9, which defines the leading edge of the whole of wing 4, and comprises a central portion 10 to the front of fixed portion 5, and two lateral portions, each fitted integrally along its trailing edge with a respective half-wing 8.

Figure 5:
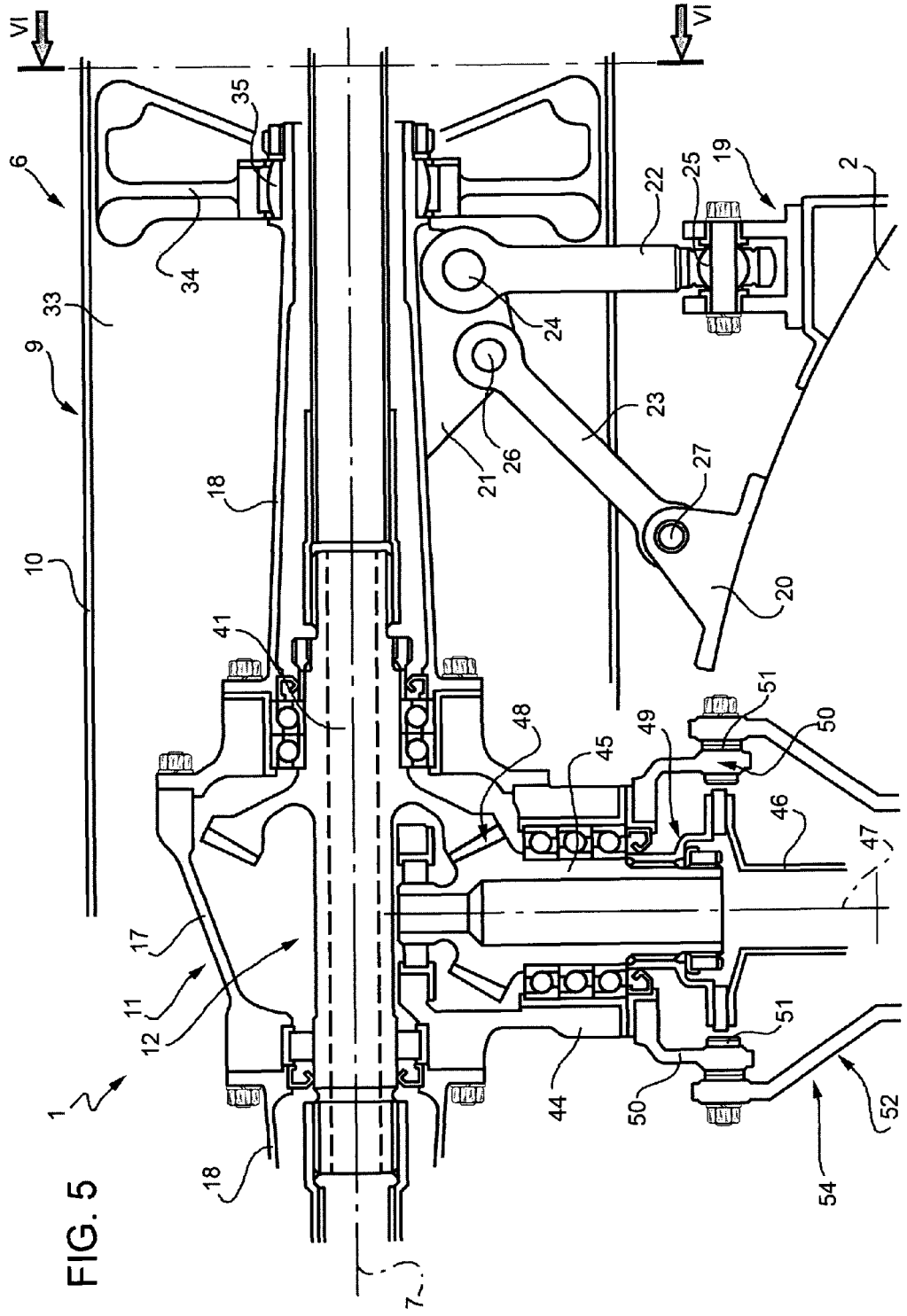
FIG. 5 shows a larger-scale section along line V-V in FIG. 3.
Figure 6:
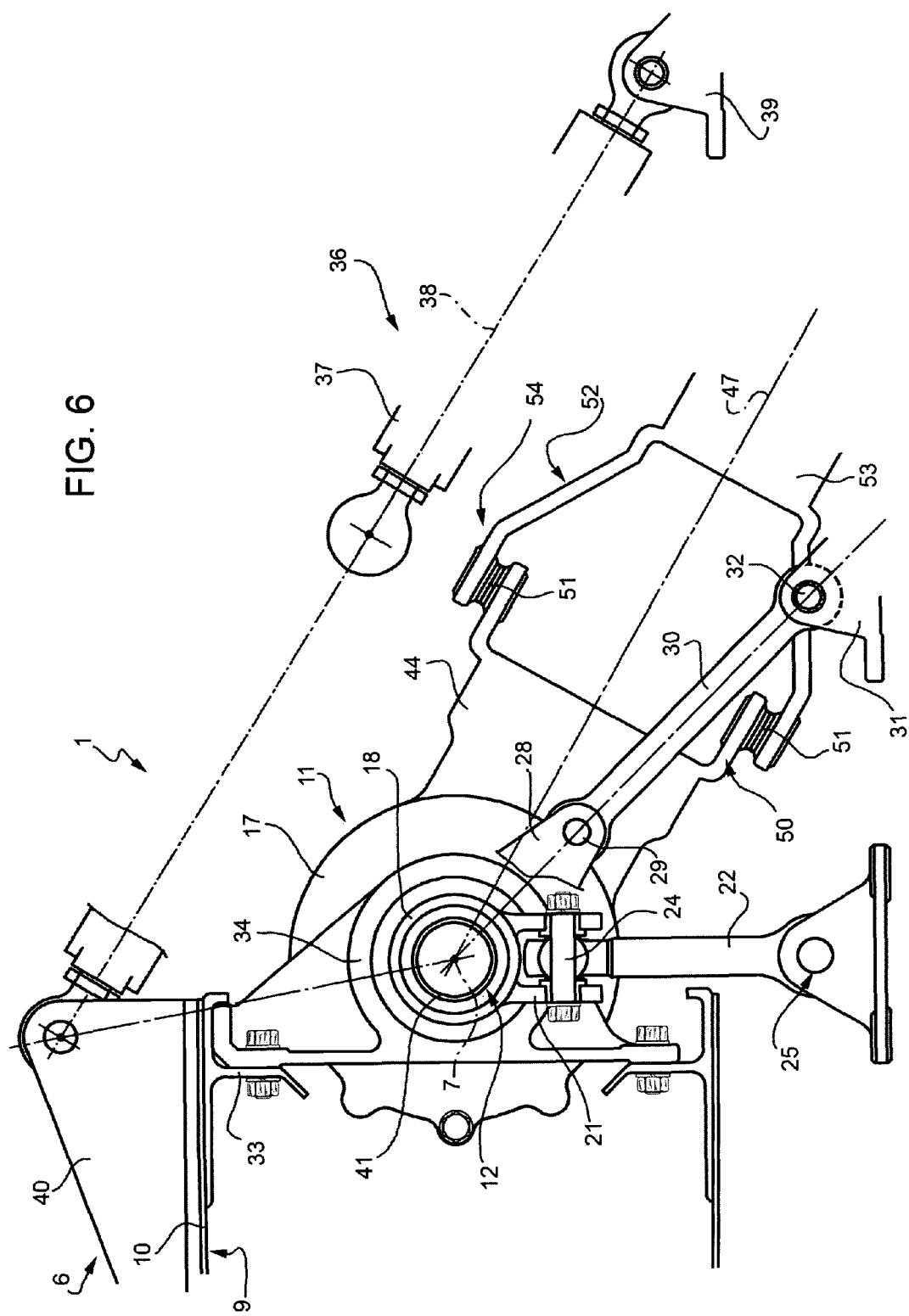
FIG. 6 shows a section along line VI-VI in FIG. 5.

With reference to FIGS. 5 and 6, fixed portion 5 of wing 4 has a supporting structure defined by a tubular transmission casing 11 of a transmission 12 connecting a central motor 13 (FIG. 4), housed inside fuselage 2, to two rotors 14. Motor 13 is fitted at the rear to fuselage 2 by a system of connecting rods (not shown), and at the front to transmission casing 11, as explained below.

Each rotor 14 is fitted to the end of a respective nacelle 15 fitted to respective half-wing 8, and rotates, in the opposite direction to the other rotor 14, about a respective axis 16 parallel to the other axis 16 and perpendicular to axis 7.

Transmission casing 11 is coaxial with axis 7, and comprises a central tubular housing 17, from the opposite ends of which two tubular, truncated-cone-shaped bodies 18 extend coaxially with axis 7, communicate with the inside of housing 17 through respective outlet openings in housing 17, and are connected integrally at their wider ends to housing 17, at the outlet openings.

Transmission casing 11 is fitted to fuselage 2 by a number of articulated ties or connecting rods. More specifically, as shown in FIGS. 5 and 6, fuselage 2 has two outer longitudinal rails 19 arranged symmetrically with respect to the vertical longitudinal plane of symmetry of fuselage 2; and two side by side, circumferential forks 20 anchored to fuselage 2, beneath housing 17. Each rail 19 is substantially parallel to longitudinal axis 3 and extends beneath an intermediate portion of relative tubular body 18, which is fitted underneath with a radial fork 21 perpendicular to longitudinal axis 3 and in turn fitted with the top ends of two connecting rods 22 and 23. Connecting rod 22 is substantially vertical, and is connected to relative fork 21 by a spherical joint 24, and to relative rail 19 by a spherical joint 25; whereas connecting rod 23 extends in a plane perpendicular to longitudinal axis 3 and through axis 7, slopes towards a vertical longitudinal plane of symmetry of fuselage 2, and is anchored to relative fork 21 by a pin 26 parallel to longitudinal axis 3, and to relative fork 20 by a pin 27 parallel to relative pin 26.

Each tubular body 18 is also fitted underneath (FIG. 6) with a rearward- and downward-sloping radial fork 28 in turn fitted, by a pin 29 parallel to axis 7, with the top end of a connecting rod 30, the bottom end of which is connected to a respective fork 31, fitted to relative rail 19, by a pin 32 parallel to relative pin 29.

As shown clearly in FIG. 6, the axes of connecting rods 22 and 30 are radial with respect to axis 7, which means connecting rods 22 and 30 are incapable of absorbing any moments applied to transmission casing 11 about axis 7.

The central portion 10 of panel 9 is closed at the rear by a spar 33, from which project rearwards two annular brackets 34 located symmetrically with respect to the longitudinal plane of symmetry of fuselage 2, and connected integrally to spar 33. Each bracket 34 is fitted through with respective tubular body 18, to which bracket 34 is connected by a respective spherical bearing 35 centred about axis 7, supported by bracket 34, and fitted to tubular body 18 coaxially with axis 7. The function of spherical bearings 35 is to allow movable portion 6, however deformed in use, to be rotated about axis 7 and with respect to fixed portion 5 by an actuating device 36 comprising two jacks 37, each of which lies in the plane of relative bracket 34, has an upward- and forward-sloping axis 38, and is interposed between a respective bottom fork 39, and a respective top outer fork 40 fitted to central portion 10 of panel 9. Though shown higher than fork 31 for illustration reasons, bottom fork 39 is preferably anchored to fuselage 2 at a point long respective longitudinal rail 19.

In a variation not shown, the two jacks 37 may be replaced with a single central jack.

A transmission shaft 41, forming part of transmission 12, extends, coaxially with axis 7, through transmission casing 11, is supported for rotation by housing 17, engages tubular bodies 18 in rotary manner, extends inside each nacelle 15, and, as shown in FIG. 2, is connected, inside each nacelle 15, to a shaft 42 coaxial with relative axis 16 and for driving relative rotor 14 by means of a respective bevel gear pair 43.

As shown in FIG. 5, transmission casing 11 has an input defined by a radial tubular body 44, in which an input shaft 45 is mounted for rotation and connected angularly to the output of a drive shaft 46 of motor 13.

Input shaft 45 is coaxial with tubular body 44, has an axis 47 perpendicular to axis 7, and is connected at one end to shaft 41 by a bevel gear pair 48 housed inside transmission casing 11, and at the other end to the free end of drive shaft 46 by an elastic joint 49.

As shown in FIG. 6, on the side facing motor 13, tubular body 44 has a fork 50, the arms of which lie in a plane perpendicular to axis 7 (in FIG. 5, the arms of fork 50 are shown in a plane parallel to axis 7 simply for illustration purposes), and are connected by coaxial pins 51 to respective arms of a further fork 52 extending from the free end of a tubular torsion body 53 integral with the front end of motor 13 and coaxial with drive shaft 46.

Tubular bodies 44 and 53 together define an articulated tubular body 54, which not only permits transmission casing 11 to support the front of motor 13, but also acts as an antirotation device for motor 13, and locks transmission casing 11 angularly to prevent it rotating about axis 7 with movable portion 6 of wing 4, when jacks 37 are operated. By virtue of the articulated joint defined by forks 50, 52 and pins 51, the bending moments generated on one side by wing 4 and on the other by the motor are not transmitted by articulated tubular body 54.

Operation of convertiplane 1 will be clear from the above structural description, with no further explanation required. As regards the structure and performance of convertiplane 1, however, it is important to note that:

half-wings 8 being connected integrally by panel 9 and rotating together about axis 7 minimizes the number of component parts of wing 4; ensures, in a straightforward, low-cost manner, and with no need for a synchronizing device, that axes 16 of rotors 14 are tilted substantially identically at all times with respect to longitudinal axis 3; and easily enables use of a single central motor 13, and a transmission 12 with a central transmission casing 11 and a single through transmission shaft 41 coaxial with axis 7;

using a single central motor 13, and a transmission 12 with a central transmission casing 11 and a single through transmission shaft 41 coaxial with axis 7, not only eliminates all the synchronizing devices required when rotors 14 are powered by respective independent motors, but also enables both rotors 14 to be powered by identical transmission devices. That is, if both rotors 14, which must rotate in opposite directions, are powered by two identical motors rotating in the same direction, one of the rotors can obviously be connected to the relative transmission shaft by a straightforward bevel gear pair, but the other rotor 14 must be connected to the relative transmission shaft by a bevel gear pair and also a power inverting device. Using a single through transmission shaft 41, on the other hand, both rotors 14, when connected to shaft 41 by respective bevel gear pairs 43, are automatically synchronized and rotate in opposite directions, with no need for any other mechanical and/or control devices, thus greatly simplifying control, and enabling a drastic reduction in the number and complexity of the component parts employed;

reducing the number and complexity of the component parts employed is also aided by articulated tubular body 54, which, as stated, acts not only as a support for the front of motor 13, but also as an antirotation device for motor 13, and for preventing transmission casing 11 from rotating about axis 7.

The invention claimed is:

1. A convertiplane (1) comprising:
a fuselage (2) having a first axis (3); two rotors (14) with respective shafts (42); and drive means (12, 13) for driving the rotors (14);
a wing (4) having a fixed portion (5) connected to the fuselage (2); and a movable portion (6) supporting the rotors (14) and connected to the fixed portion (5) to rotate about a second axis (7) crosswise to the first axis (3) and the shafts (42) of the rotors (14); and
actuating means (37) for rotating the movable portion (6), about the second axis (7), between a lowered position and a raised position, in which the shafts (42) of the rotors (14) are substantially parallel to and substantially crosswise to the first axis (3) respectively;

the convertiplane (1) being characterized in that the movable portion (6) is formed in one piece comprising two half-wings (8) located on opposite sides of the fixed portion (5) and each supporting a respective said rotor (14); and an elongated member (9) extending along the whole wing (4) and connecting the half-wings (8) to each other; and the drive means (12, 13) comprise motor means (13), and a transmission (12) in turn comprising a transmission shaft (41) connecting the shafts (42) of the rotors (14) and coaxial with the second axis (7), wherein the elongated member (9) defines a leading edge of the whole wing (4), and comprises a central portion (10) extending in front of the fixed portion (5).

2. A convertiplane as claimed in claim 1, wherein the movable portion (6) is connected to the fixed portion (5) by two spherical bearings (35) centred about the second axis (7) and on opposite sides of the first axis (3).

3. A convertiplane as claimed in claim 1, wherein the motor means (13) comprise a single central motor (13) fitted to the fuselage (2) and having a drive shaft (46) extending radially with respect to the transmission shaft (41).

4. A convertiplane as claimed in claim 1, wherein the transmission shaft (41) is connected directly to the shafts (42) of the rotors (14) by respective bevel gear pairs (43).

5. A convertiplane as claimed in claim 1, wherein the transmission (12) comprises a transmission casing (11) connected in rotary manner to the movable portion (6) of the wing (4).

6. A convertiplane as claimed in claim 5, wherein the transmission casing (11) defines a supporting member for the movable portion (6) of the wing (4), and is supported directly by the fuselage (2).

7. A convertiplane as claimed in claim 5, wherein the transmission shaft (41) extends through the transmission casing (11), which extends along the second axis (7); two spherical bearings (35), centred about the second axis (7), being fitted to the movable portion (6), and being fitted to the transmission casing (11) to connect the movable portion (6) to the transmission casing (11).

8. A convertiplane as claimed in claim 5, and comprising articulated supporting means (22, 23, 30) interposed between the transmission casing (11) and the fuselage 82) to connect the movable portion (6) to the fuselage (2).

9. A convertiplane as claimed in claim 5, wherein the transmission casing (11) comprises an input shaft (45), which rotates about a third axis (47), perpendicular to the second axis (7), and is connected angularly to the drive shaft (46).

10. A convertiplane as claimed in claim 5, wherein antirotation means (54) are provided to prevent the transmission casing (11) from rotating with the movable portion (6) of the wing (4) about the second axis (7).

11. A convertiplane as claimed in claim 9, wherein the antirotation means (54) comprise a tubular torsion body (53) of the motor means (13); the tubular torsion body (53) being coaxial with the third axis (47).

12. A convertiplane as claimed in claim 11, wherein the antirotation means (54) also comprise a tubular input body (44) of the transmission casing (11); the tubular input body (44) being coaxial with the third axis (47), and being hinged to the tubular torsion body (53) to form, with the tubular torsion body (53), an articulated tubular body (54) defining the antirotation means (54).

* * * * *